United States Patent [19]

Gens et al.

[11] Patent Number: 4,844,881
[45] Date of Patent: Jul. 4, 1989

[54] PROCESS FOR THE PRODUCTION OF SULFUR FROM HYDROGEN SULFIDE USING HIGH CONCENTRATION OXYGEN AND RECYCLE IN COMBINATION WITH A SCRUBBING TOWER

[75] Inventors: Theodore A. Gens, North Plainfield; Mit S. Tucker, Murray Hill; John J. Grob, Livingston, all of N.J.

[73] Assignee: The BOC Group, Inc., New Providence, N.J.

[21] Appl. No.: 832,193

[22] Filed: Feb. 24, 1986

[51] Int. Cl.⁴ .................. C03B 17/04; C01B 17/05
[52] U.S. Cl. .................. 423/574 R; 423/574 L
[58] Field of Search .......... 423/574 R, 574 G, 574 L, 423/576; 55/73

[56] References Cited

U.S. PATENT DOCUMENTS

| | | | |
|---|---|---|---|
| 1,925,198 | 9/1933 | Melvill | 423/574 L |
| 3,681,024 | 8/1972 | Hujsak et al. | 423/574 G |
| 3,822,341 | 7/1974 | Smith | 423/574 G |
| 4,552,747 | 11/1985 | Goar | 423/DIG. 6 |

FOREIGN PATENT DOCUMENTS

| | | | |
|---|---|---|---|
| 797739 | 10/1968 | Canada | 423/574 |
| 2207115 | 8/1973 | Fed. Rep. of Germany | 55/73 |
| 2832493 | 2/1980 | Fed. Rep. of Germany | 55/73 |

Primary Examiner—John Doll
Assistant Examiner—Jeffrey Edwin Russel
Attorney, Agent, or Firm—R. Hain Swope; Chris P. Konkol; Larry R. Cassett

[57] ABSTRACT

An improved process for sulfur recovery from a gaseous feed comprising hydrogen sulfide is disclosed. The gaseous feed is admixed with concentrated oxygen in a burner, where the hydrogen sulfide is partially converted to vaporous sulfur. The effluent from the burner is passed through a boiler, in which the temperature of the reaction mixture is reduced and steam co-generated. The effluent from the boiler is subsequently passed to a sulfur condensor, for recovering liquid sulfur, and then to a water condensor. The uncondensed gas is recycled to the burner. A portion of this gas is withdrawn from the recycle loop, pressurized, and routed to a scrubbing tower, where the residual sulfur compounds are further reacted and the gas cleaned. Condensate from the water condenser is also pumped into the scrubbing tower, where residual sulfur compounds are reacted and sulfur removed.

20 Claims, 1 Drawing Sheet

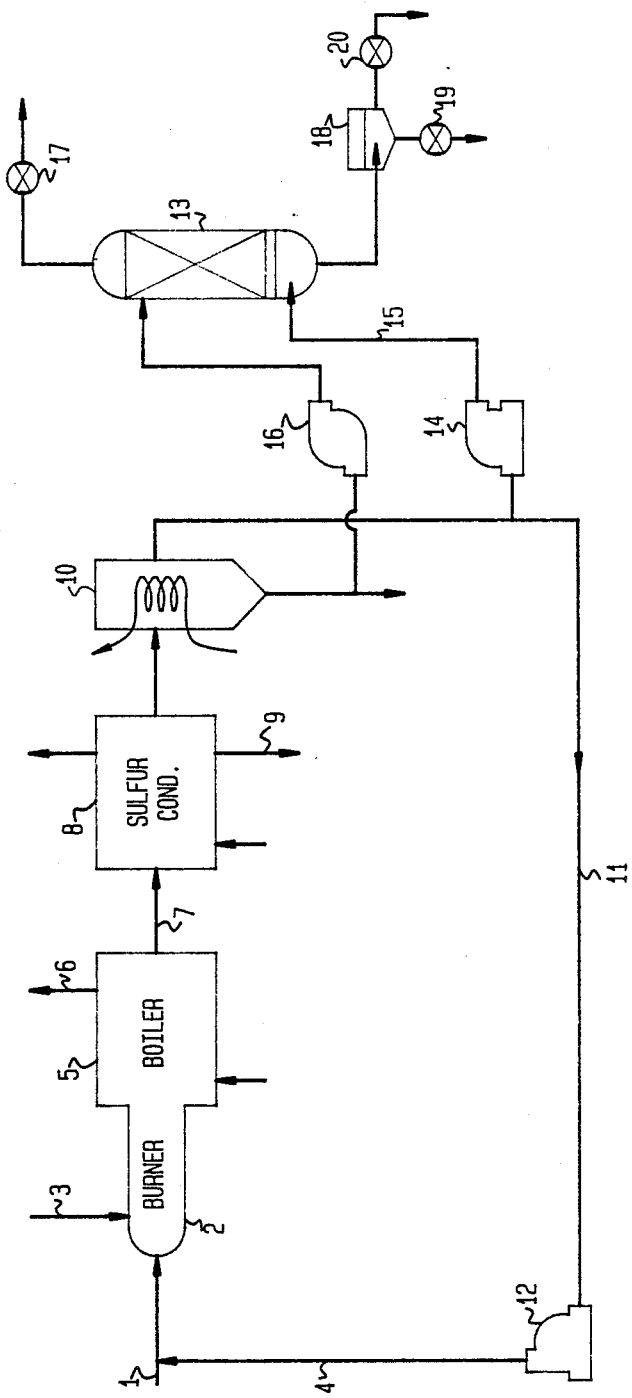

PROCESS FOR THE PRODUCTION OF SULFUR FROM HYDROGEN SULFIDE USING HIGH CONCENTRATION OXYGEN AND RECYCLE IN COMBINATION WITH A SCRUBBING TOWER

BACKGROUND OF THE INVENTION

The present invention relates to an improved process for the production of sulfur from hydrogen sulfide. In particular, the present process comprises admixing concentrated oxygen with hydrogen sulfide containing feed gas in a burner and recycling thereto a portion of the reaction product, following the removal of elemental sulfur and water. A scrubbing tower is employed for treatment of a portion of the recycle gas.

The production of sulfur from hydrogen sulfide according to the Claus process is well known in the chemical industry. In this process, a gas mixture comprising hydrogen sulfide, typically a by-product of a petroleum refining plant, is combusted in a burner with oygen, usually in the form of air, to produce sulfur dioxide according to the following reaction:

$$2H_2S + 3O_2 \rightarrow 2SO_2 + 2H_2O \quad (1)$$

The effluent from the burner, containing stoichiometric quantities of one volume of $SO_2$ with two volumes of $H_2S$ is then passed to a Claus type reactor, where elemental sulfur is produced according to the following reaction:

$$2H_2S + SO_2 \rightleftharpoons 3S + 2H_2O \quad (2)$$

Since the reaction is at an elevated temperature, the sulfur product is in its vapor phase and must be liquified in a sulfur condensor. Typically, a series of reactors and condensors are employed to yield a high overall conversion rate.

One disadvantage of a conventional Claus type recovery plant is that the capacity thereof is restricted by the practical pressure limits in the plant, notably by the combustio air blower head and sulfur seal leg depth. The capacity can be increased by replacing air with concentrated oxygen, thereby reducing the flow volume and pressure drop through the system. However, beyond an enrichment level of about 30%, flame temperature limitations of the refractory lining in a conventional burner are exceeded.

Another disadvantage of a conventional Claus type recovery plant is that, due to increasing environmental standards, the yield of sulfur must be maximized, either by using a series of expensive reactors, each successive reactor achieving a decreasing percentage yield, and/or else by employing capital intensive pollution control devices such as present in a conventional tail gas plant, in order to remove unconverted reactants and other pollutants from the off-gas.

To overcome the high temperature problem resulting frm the use of oxygen, it is generally known to recycle to the burner, the low temperature effluent from a later stage of the sulfur recovery plant. This recycle stream serves to dilute and cool the reaction mixture within the burner, thereby controlling the flame temperature.

U.S. Pat. No. 3,331,733 to Venemark discloses a Claus process using a source of oxygen comprising 98% by volume of oxygen and 2% by volume of inert gases. The feed gas entering the Claus plant is cooled and mixed with recycle carbon dioxide containing gas obtained from a Claus combustion furnace system.

U.S. Pat. No. 3,681,024 to Hujsak et al. discloses a method for the production of sulfur from hydrogen sulfide using substantially pure oxygen rather than air, in order to materially decrease the volume of sulfur plant effluent discharged to the atmosphere. The uncondensed fraction separated from the product sulfur is subjected to a condensing or quenching step wherein any free sulfur vapor present in such fraction is removed from the system. The portion of the fraction which remains uncondensed is split into two streams, the larger one of which is recycled to the furnace, and the smaller one which is purged to the atmosphere.

In Oil & Gas Journal, Sept. 30, 1985, pages 39–41, Goar et al. describes the advantages of using pure oxygen in place of air. An 85% increase in capacity was obtained by enriching the air supply to 55% oxygen. Goar et al. discribes recycling a portion of the product mixture, following combustion and condensation and prior to catalytic conversion. The recycle stream acts as a coolant to moderate the reaction furnace temperature, effectively replacing nitrogen as the diluent. Following combustion of the hydrogen sulfide feed gas, a series of three catalytic reactors and condensors are used to recover, respectively, 24.9%, 4.4% and 0.9% of the sulfur contained in the feed gas.

The prior art also discloses in general the use of a scrubbing tower to reduce the escape of reactants and other pollutants into the environment. U.S. Pat. No. 2,413,714 to Keeling discloses a process for producing sulfur in which, following combustion with air and catalytic reaction, the products of reaction are cooled by direct contact with liquid water. The water is at a pressure and temperature above the melting point of the produced sulfur, and the latter therefore condenses to its liquid phase. Thereafter, the gases that are residual to the cooling step are treated in a second direct contact with water, at a temperature lower than the first cooling step, in order to minimize the volume of gases which escape from the reaction system.

The present invention represents an improvement over the prior art in several important respects. The present process does not require catalyst and Claus type reactors to complete conversion of hydrogen sulfide to elemental sulfur. This alone is a considerable savings in equipment and maintenance costs. The present process also permits the use of oxygen, thereby increasing plant capacity and reducing energy consumption. The present process also produces 50% more high pressure steam than processes described in the prior art.

A further advantage of the present invention resides in the use of a relatively high pressure scrubbing tower which is located external to a relatively low pressure recycle loop. This scrubbing tower is designed to complete the reaction of the remaining sulfur gases. The combination of a unpressurized recycle loop, incorporating a water condensor, and a pressurized scrubbing tower, external to the recycle loop, is particularly advantageous because the gas mixture withdrawn from the recycle line, in addition to undergoing further reaction, can be cleaned in the scrubbing tower, and the condensed water from the water condenser can also be cleaned in the same scrubbing tower, offering significant economies, particularly in view of present environmental standards and the relatively high cost of conventional tail gas treatment and pollution control devices.

OBJECTS OF THE INVENTION

An object of the present invention is to improve the recovery of sulfur from a hydrogen sulfide containing feed gas by the reaction of the feed gas with relatively pure oxygen in a burner unit. A further object of the present invention is to improve the recovery of sulfur from hydrogen sulfide containing feed gas by introducing recycled effluent gas into the burner unit to control the flame temperature therein. A further object of the present invention is to eliminate the need for catalytic reactors for converting $SO_2$ and $H_2S$ to sulfur. Yet a further object of the present invention is to complete the Claus reaction and remove undesirable pollutants before releasing off-gas or water to the environment, by withdrawing a portion of the recycle stream and treating this portion in a scrubbing tower and by treating condensate water in the same scrubbing tower. These and other objects of the invention will be more readily appreciated by reference to the following description of a preferred embodiment of the invention.

BRIEF DESCRIPTION OF THE DRAWINGS

The sole FIGURE is a flow diagram of the present invention for the improved recovery of sulfur from a hydrogen sulfide containing stream.

DETAILED DESCRIPTION OF THE INVENTION

A feed stream 1 comprising a hydrogen sulfide containing feed gas is introduced into a burner 2, which conventionally comprises an elongated, refractory lined chamber for admixture and combustion of the inlet gases. A stream of oxygen 3 is likewise introduced into the burner. Additionally, the recycle stream 4 is admixed with the other inlet streams. It will be readily appreciated that the recycle stream can be introduced directly into the burner rather than admixed with the feed stream, and vice versa with respect to the oxygen stream.

The feed gas stream typically comprises 50 to 100 mole percent hydrogen sulfide. Preferably, the feed gas stream should have a hydrogen sulfide concentration of greater than 80 percent. The oxygen stream is suitably 30 to 100 mole percent oxygen, preferably at least 60 percent oxygen, and most preferably greater than 80 percent oxygen.

The hydrogen sulfide in the feed gas is combusted with the oxygen to form sulfur dioxide according to equation (1) above and the sulfur dioxide in turn is converted to the desired sulfur according to equation (2). The recycle stream 4, having been previously cooled, cools and dilutes the reaction mixture in the burner and ensures that the flame temperature is maintained below about 3000° F. and preferably in a range of 2400° to 2800° F. The products of combustion, after issuring from burner 2, flow into a waste heat boiler 5, which cools them to a temperature of about 300° C. The boiler 5 recovers the heat generated by the exothermic combustion and produces high pressure steam, having utility as a source of power, discharged via line 6. It will be appreciated that means other than a boiler may be employed for cooling the reaction product mixture.

The burner unit, with the benefit of recycle, achieves a high overall conversion of the original hydrogen sulfide in the feed stream 1. The cooled reaction mixture stream 7 proceeds to a fulfur condensor 8, which further cools the gas mixture to a suitable temperature of approximately 150° C., while also producing steam. At this temperature, the sulfur is condensed to form a molten product stream 9, recoverable as a portion of the final product. The residual gas stream from the sulfur condenser 8 typically contains a mixture of various amounts of carbon dioxide, uncondensed sulfur vapor, hydrogen sulfide, sulfur oxides, hydrocarbons, carbon sulfides, and the like. This mixture proceeds to a water condensor 10 for further cooling and water removal by indirect and/or direct contact with a cold water stream at a suitable temperature of about 50° C. The cooled mixture, depleted of most of its water content, is then recycled via line 11 and recycle blower 12, to the burner 2, where it is admixed with the feed gas stream 1 as explained above.

A primary purpose of the water condensor is to cool the recycle stream so that water formed in the reaction, according to equation (2) above, is condensed out, and thereby does not contribute to gas flow through the system. The condensate and quench water, in the event that direct contact with water is employed, do not adsorb much $CO_2$, $H_2S$ or $CO_2$ from the recycle stream, since they are not very soluble. However, $SO_2$ is adsorbed in the quench water in higher amounts.

The condensate volume exceeds that which is needed for removing reaction heat in a scrubbing tower 13. The water condensate, including the excess, may be further treated and cleansed in the scrubbing tower 13, as will be explained in greater detail below.

A portion of the recycle gas in line 11 is bled from the recycle loop into a compressor 14 and via line 15 enters the scrubbing tower 13, which also receives the water condensate from water condensor 10 via pump 16.

The scrubbing tower has the primary purpose of completing reaction in both the gas and water streams, while simultaneously separating out liquid sulfur product. To raise the temperature above the sulfur melting point (115° C.) and to promote reaction, an elevated pressure is established in the scrubbing tower by compressor 14. A pressure control valve 17 may be employed to regulate the back pressure in the scrubbing tower 13. Suitably, a pressure of 2 to 10 atmospheres absolute, more preferably 4 to 8 atmospheres and most preferably about 6 atmospheres is maintained in the scrubbing tower 13.

The volumetric flow rate of the gas mixture to the scrubbing tower is typically about one-tenth the volumetric flow rate of the initial feed gas, and the concentration of the sulfur containing constituents is only about two-tenths of the concentration in the initial feed gas.

The scrubbing tower 13 may optionally contain packing material above the boiling water in the bottom of the tower to promote contact between the countercurrent liquid and gas phases. Reaction of the remaining sulfur constituents occurs in the scrubbing tower, thereby achieving substantially complete conversion. The molten sulfur and water in the scrubbing tower is withdrawn from the bottom region thereof and is introduced into a tank 18, where the dense sulfur can be removed through valve 19, as a final product. The excess water can be removed via valve 20 for appropriate disposal. It will be readily understood that a conventional automatic level controller may be employed to actuate valve 20.

The unreacted sulfur containing constituents in the bleed gas mixture are rapidly reacted upon being introduced below the water level in the bottom of the scrubbing tower 13. Any hydrogen sulfide and sulfur dioxide which escape from solution is scrubbed in the upper region of the scrubbing tower, which is progressively cooler in the ascending direction. The descending water in the scrubbing tower scrubs the traces of sulfur dioxide and hydrogen sulfide from the upflowing gases to form a dispersed sulfur suspension. Descending the scrubbing tower, this dispersed sulfur aggregates to form molten sulfur.

The cleansed gas from the scrubbing tower 13, after passing through pressure control valve 17, can be vented or sent to a stack for release to the ambient environment. This gas will be largely depleted of noxious contaminants and pollutants.

The relative amount of recycle flow is predetermined to achieve the desired conversion and cooling in the burner. The amount of recycle is selected to replace the nitrogen in the air feed in the usual Claus process, so that a standard burner may be used in the conventional manner. The volume of the bleed stream is determined by the non-condensable gases in the process, primarily $CO_2$, residual water vapor, and unreacted sulfur gases. An overall conversion of 97% is obtainable in the recycle loop with a 90% hydrogen sulfide feed, because of the high recycle rate, and an overall conversion of up to 99.9% is obtainable in the scrubbing tower, with 0.1% or less sulfur compounds in the off-gas, thereby obviating expensive and burdensome pollution control apparatus typically required by prior art Claus type plants.

An unusual feature of the present invention is he enhancement of conversion by a high recycle ratio to the burner. Although only approximately two-thirds conversion can be achieved per pass, the overall burner conversion increases to about 97% with recycle in the case of a 90% $H_2S$ feed. The ratio is selected so that heat produced per volume of gas in the burner approximates that in a conventional Claus type burner using air. This permits the use of conventional burners made of conventional materials, so that present Claus type plants are subject to retrofit according to the present process.

A suitable mole ratio of recycle gas to feed gas is in the range of 1:2 to 5:1, preferably in the range of 1:1 to 3:1, and most preferably about 2:1. A suitable mole ratio of scrubbing tower gas to feed gas is 1:20 to 1:2, preferably 1:15 to 1:5 and most preferably about 1:10. A suitable ratio of oxygen gas to feed gas is about 1:2.

The use of recycle gas to dilute the combustion reaction has the added advantage of decreasing the amount of carbon monoxide from the high levels sometimes observed. The presence of large amounts of CO is undesirable because some of the CO forms undesirable COS when the gases cool downstream. In the present process, little COS is found in the product gas bled to the scrubbing tower because the COS decomposes upon recycling through the hot burner.

The following example illustrates a continuous process according to the present invention. Unless otherwise indicated, all parts are in units of Kg-mole/hour.

EXAMPLE

Originating as the exhaust gas from a petroleum refining plant, a gaseous mixture at ambient temperature containing 130 parts $H_2S$, 8.67 parts $CO_2$, 2.8 parts $CH_4$, and 2.89 parts water are fed into a refractory lined burner operating at about 2500° F., where this gaseous mixture is admixed with (1) an oxygen stream at ambient temperature containing 70.8 parts oxygen, and (2) a recycle gas stream at 50° C. containing 200.3 parts $CO_2$, 39.9 parts $H_2S$, 27.0 parts $H_2O$, 1.79 parts COS, and 19.9 parts $SO_2$. Following combustion in the burner, where most of the $H_2S$ in the feed is converted to elemental sulfur, the gaseous mixture enters a boiler zone where the gaseous mixture is cooled to 300° C. The effluent from the boiler container 211.8 parts $CO_2$, 163.4 parts $H_2O$, 63.25 parts vaporous $S_2$, 42.2 parts unreacted $H_2S$, 21.1 parts unreacted $SO_2$ and 1.90 parts COS. This effluent is next cooled to 150° C. in a sulfur condensor, whereupon 63.25 parts of $S_2$ final product is obtained. The $S_2$ depleted effluent proceeds to a water condensor, where the effluent is quenched and cooled to 45° C. The gas mixture leaving the water condensor is recycled to the burner for introduction into the burner as mentioned above. However, a portion of this recycle gas is bled via a compressor and directed to a scrubbing tower operating at a pressure of 6 atmospheres absolute. This gas, comprising a mixture of 11.6 parts $CO_2$, 2.3 parts $H_2S$, 1.56 parts $H_2O$, 1.15 parts $SO_2$ and 0.1 parts COS, is introduced into the scrubbing tower below the water level in the bottom thereof, whereby at a temperature of 120° C., rapid reaction of unreacted $SO_2$ and $H_2S$ in the gas mixture results in conversion to 1.64 parts of $S_2$. The sulfur depleted gas mixture thereafter flows upwards in the scrubbing tower, where it is placed in direct contact with a mist of water flowing downwards from the upper region of the tower. The condensate water from the condenser in the recycle loop is pumped into the top of the tower. The water mist cleanses the gas mixture before it exits the scrubbing tower for release to the atmosphere. The off-gas contains 0.12 parts $H_2S$, 11.6 parts $CO_2$, 0.3 parts $H_2O$, 0.1 parts COS, and 0.06 parts $SO_2$ at a temperature of 45° C. An effluent of 139 parts of water in the bottom of the scrubbing tower is disposed of as a relatively benign by-product of the process.

The data from the above example is presented in Tables I and II below. Condensate water, in excess of that required for cooling the scrubbing tower, is listed separately in Table 1 and Table II. The quantity of excess condensate water is of interest because heat has to be added to the scrub tower to warm this excess condensate to the 120° C. temperature required at the bottom of the scrub tower. This excess water is normally routed through the wash tower to cleanse it of sulfur and dissolved $H_2S$ and $SO_2$ before disposal.

TABLE I

| Stream | $CH_4$ | $H_2S$ | $CO_2$ | $O_2$ | $H_2O$ | $S_2$ | COS | $SO_2$ |
|---|---|---|---|---|---|---|---|---|
| FEED GAS Kg-Mole/Hr. | 2.89 | 130 | 8.67 | 0 | 2.89 | 0 | 0 | 0 |
| RECYCLE GAS | 0 | 39.9 | 200.3 | 0 | 27.0 | 0 | 1.79 | 19.9 |
| $O_2$ GAS | | | | 70.8 | | | | |
| BURNER REACTION MIXTURE | 2.89 | 169.9 | 208.9 | 70.8 | 29.9 | 0 | 1.79 | 19.9 |
| BURNER | 0 | 42.2 | 211.8 | 0 | 163.4 | 63.25 | 1.90 | 21.1 |

TABLE I-continued

| Stream | CH$_4$ | H$_2$S | CO$_2$ | O$_2$ | H$_2$O | S$_2$ | COS | SO$_2$ |
|---|---|---|---|---|---|---|---|---|
| PRODUCTS GAS | | | | | | | | |
| SULFUR CONDENSATE LIQUID | | | | | | 63.25 | | |
| GAS FROM SULFUR CONDENSER | 0 | 42.2 | 211.8 | 0 | 163.4 | 0 | 1.9 | 21.1 |
| CONDENSED WATER | | | | | 135 | | | |
| GAS TO SCRUB TOWER | 0 | 2.3 | 11.6 | 0 | 1.56 | 0 | 0.1 | 1.15 |
| LIQUID SULFUR FROM SCRUB TOWER | | | | | | 1.64 | | |
| LIQUID WATER FROM WASH TOWER | | | | | 50.9 | | | |
| GASEOUS PROCESS EFFLUENT | 0 | .12 | 11.6 | 0 | 0.3 | 0 | 0.1 | 0.06 |
| EXCESS CONDENSATE WATER | | | | | 88 | | | |

TABLE II

| Stream | Kg-mole/hr | Kg/hr | K-L Gas/hr. | T° C. | Pressure ATM.ABS. |
|---|---|---|---|---|---|
| FEED GAS Kg-Mole/Hr. | 144.45 | 4899.6 | 3548 | 25 | 1 |
| RECYCLE GAS | 288.9 | 12037 | 7691 | 50 | 1 |
| O$_2$ GAS | 70.8 | 2266 | 1739 | 25 | 1 |
| BURNER REACTION MIXTURE | 510 | 19200 | 13000 | 40 | 1 |
| BURNER PRODUCTS GAS | 504 | 19200 | 24000 | 300 | 1 |
| SULFUR CONDENSATE LIQUID | 63.25 | 4048 | — | 150 | 1 |
| GAS FROM SULFUR CONDENSER | 440 | 15340 | 14250 | 150 | 1 |
| CONDENSED WATER | 135 | 2426 | — | 45 | 1 |
| GAS TO WASH TOWER | 16.71 | 696 | 74.2 | 50 | 6 |
| LIQUID SULFUR FROM SCRUB TOWER | 1.64 | 105 | — | 120 | 6 |
| LIQUID WATER FROM WASH TOWER | 50.9 | 914 | — | 120 | 6 |
| GASEOUS PROCESS EFFLUENT | 12.2 | 530 | 53.3 | 45 | 6 |
| EXCESS CONDENSATE WATER | 88 | 1580 | — | 45 | 1 |

I claim:

1. A process for the recovery of sulfur from a hydrogen sulfide containing feed gas, comprising the following steps:
    (i) combusting hydrogen sulfide containing feed gas in admixture with oxygen concentrated to at least 30 mole percent and recycled gas from step (iv), so that a portion of said hydrogen sulfide is converted to sulfur dioxide and the uncombusted hydrogen sulfide reacts with said sulfur dioxide to produce a substantial quantity of elemental sulfur, thereby forming a mixture comprising free sulfur, water, and unconverted reactants;
    (ii) cooling said mixture to condense liquid sulfur therefrom;
    (iii) subjecting the uncondensed portion of said mixture to a further cooling step to condense water therefrom;
    (iv) recycling the effluent from the water condensation step to the combustion step (i) above;
    (v) withdrawing a portion of the gas mixture from the recycle loop, pressurizing said withdrawn gas mixture, and directing the same to the hot bottom region of a scrubbing tower, wherein residual amounts of hydrogen sulfide and sulfur dioxide are converted to elemental sulfur;
    (vi) pumping condensed water from step (iii) into the top of said scrubbing tower;
    (vii) subjecting unconverted constituents of said gas mixture in said scrubbing tower to direct contact with cool water to adsorb said constituents and other pollutants in said gas mixture;
    (viii) separating the liquid sulfur and water accumulating in the bottom region of said scrubbing tower; and
    (ix) disposing of the off-gas from said scrubbing tower.

2. The process of claim 1, wherein said concentrated oxygen is at least 60 percent oxygen.

3. The process of claim 1, wherein said oxygen comprises 80 to 100 percent oxygen.

4. The process of claim 1, wherein the combusted mixture is passed to a boiler to recover heat energy in the form of steam.

5. The process of claim 1, wherein the burner is maintained at a temperature in the range of 3000° F. to 2000° F.

6. The process of claim 1, wherein the burner is substantially at atmospheric pressure.

7. The process of claim 1, wherein said water condensor is substantially at a pressure of 1 atmosphere.

8. The process of claim 1, wherein the liquid sulfur and water accumulating in the bottom region of said scrubbing tower is sent to a tank wherein said liquid sulfur is withdrawn from the bottom thereof and excess water is withdrawn from a side thereof.

9. The process of claim 1, wherein the scrubbing tower is maintained at a pressure of 2 to 10 atmosphere absolute.

10. The process of claim 9, whereas the pressure in the scrubbing tower is maintained in the range of 4 to 8 atmospheres absolute.

11. The process of claim 9, wherein the pressure in said scrubbing tower is maintained at about 6 atmospheres absolute.

12. The process of claim 1, wherein the ratio of recycled gas to hydrogen-sulfide containing feed gas is in the range of 5:1 to 1:2.

13. The process of claim 1, wherein the ratio of feed gas to gas withdrawn for introduction into said scrubbing tower is in the range of 20:1 to 3:1.

14. The process of claim 1, wherein the ratio of oxygen to feed gas is about 1:2.

15. The process of claim 1, wherein the gas mixture introduced into said scrubbing tower is countercurrently contacted with water, wherein the temperature in said tower decreases in ascending direction.

16. The process of claim 1, wherein water is condensed by indirect contact with water cooling.

17. The process of claim 1, wherein water is condensed by direct contact with cooling water.

18. The process of claim 1, where said feed gas comprises 80 to 100 percent hydrogen sulfide.

19. A process for the recovery of sulfur from a hydrogen sulfide containing feed gas, comprising the following steps:
 (i) combusting hydrogen sulfide containing feed gas in admixture with oxygen concentrated to at least 30 mole percent and recycled gas from step (iv), so that a portion of said hydrogen sulfide is converted to sulfur dioxide, and the uncombusted hydrogen sulfide reacts with said sulfur dioxide to produce a substantial quantity of elemental sulfur, thereby forming a mixture comprising free sulfur, water, and unconverted reactants;
 (ii) cooling said mixture to condense liquid sulfur therefrom;
 (iii) subjecting the uncondensed portion of said mixture to a further cooling step condense water therefrom;
 (iv) recycling the gaseous effluent from the water condensation step to the combustion step (i) above, wherein steps (i) and (iv) are carried out at a low pressure relative to the scrubbing tower of step (v);
 (v) withdrawing a portion of the, gaseous mixture in the recycle loop, pressurizing said withdrawn portion, and directing the same to the hot bottom region of a scrubbing tower maintained at a pressure of 2 to 10 atmospheres absolute, whereby residual amounts of hydrogen sulfide and sulfur dioxide are converted to elemental sulfur;
 (vi) pumping condensed water from step (iii) into the top of said scrubbing tower;
 (vii) subjecting unconverted constituents of said gas mixture in said scrubbing tower to direct contact with cool water, to adsorb said constituents and other pollutants from said mixture;
 (viii) separating out the liquid sulfur and water accumulating in the bottom region of said scrubbing tower; and
 (ix) disposing of the off-gas from said scrubbing tower.

20. A process for the recovery of sulfur from a hydrogen sulfide containing feed gas, comprising the following steps:
 (i) combusting hydrogen sulfide containing feed gas in admixture with oxygen concentrated to at least 30 mole percent and recycled gas from step (iv), so that a portion of said hydrogen sulfide is converted to sulfur dioxide, and the uncombusted hydrogen sulfide reacts with said sulfur dioxide to produce a substantial quantity of elemental sulfur, thereby forming a mixture comprising free sulfur, water, and unconverted reactants;
 (ii) cooling said mixture to separate liquid sulfur therefrom;
 (iii) subjected the uncondensed portion of said mixture to a further cooling step to condense water therefrom;
 (iv) recycling the effluent from the water condensation step to the combustion step (i) above, wherein the ratio of recycled gas to hydrogen sulfide containing feed gas is in the range of 5:1 to 1:2;
 (v) withdrawing a portion of the gas mixture in the recycle loop, pressurizing said withdrawn portion, and directing the same to the bottom region of a scrubbing tower maintained at a pressure of 2 to 10 atmospheres absolute, wherein the ratio of gas withdrawn for introduction into said scrubbing tower to feed gas is 1:20 to 1:3, whereby residual amounts of hydrogen sulfide and sulfur dioxide are converted to elemental sulfur;
 (vi) pumping condensed water from step (iii) into the top of said scrubbing tower;
 (vii) subjecting unconverted substituents or said gas mixture in said scrubbing tower to direct contact with cool water, to adsorb said constituents and other pollutants in said mixture;
 (viii) separating out the liquid sulfur and water accumulating in the bottom region of said water tower; and
 (ix) disposing of the off-gas from said scrubbing tower.

* * * * *